(12) United States Patent
Prahlad et al.

(10) Patent No.: US 8,982,531 B2
(45) Date of Patent: Mar. 17, 2015

(54) ADDITIONAL FORCE AUGMENTED ELECTROADHESION

(71) Applicant: SRI International, Menlo Park, CA (US)

(72) Inventors: Harsha Prahlad, Cupertino, CA (US); Brian K. McCoy, Sunnyvale, CA (US); Roy D. Kornbluh, Palo Alto, CA (US); Ronald E. Pelrine, Longmont, CO (US); Philip A. von Guggenberg, Redwood City, CA (US)

(73) Assignee: SRI International, Menlo Park, CA (US)

( * ) Notice: Subject to any disclaimer, the term of this patent is extended or adjusted under 35 U.S.C. 154(b) by 193 days.

(21) Appl. No.: 13/653,376

(22) Filed: Oct. 16, 2012

(65) Prior Publication Data

US 2014/0133062 A1    May 15, 2014

Related U.S. Application Data

(60) Provisional application No. 61/549,099, filed on Oct. 19, 2011.

(51) Int. Cl.
*H01T 23/00* (2006.01)
*H02N 13/00* (2006.01)

(52) U.S. Cl.
CPC ................................. *H02N 13/00* (2013.01)
USPC ........................................ 361/234; 361/230

(58) Field of Classification Search
USPC ................................................. 361/234, 230
See application file for complete search history.

(56) References Cited

U.S. PATENT DOCUMENTS

| | | | |
|---|---|---|---|
| 4,969,168 A * | 11/1990 | Sakamoto et al. | 378/34 |
| 6,922,324 B1 | 7/2005 | Horwitz | |
| 7,551,419 B2 | 6/2009 | Pelrine et al. | |
| 8,325,458 B2 | 12/2012 | Prahlad et al. | |
| 8,564,926 B2 | 10/2013 | Prahlad et al. | |
| 2003/0044577 A1* | 3/2003 | Dhar et al. | 428/137 |
| 2005/0030469 A1* | 2/2005 | Murata et al. | 349/187 |
| 2008/0089002 A1 | 4/2008 | Pelrine et al. | |
| 2010/0194012 A1* | 8/2010 | Tatsumi et al. | 269/21 |

FOREIGN PATENT DOCUMENTS

| | | |
|---|---|---|
| JP | 6-126661 | 5/1994 |
| JP | 2003-285289 | 10/2003 |
| WO | 2007/110191 A1 | 10/2007 |

* cited by examiner

*Primary Examiner* — Danny Nguyen
(74) *Attorney, Agent, or Firm* — McDonnell Boehnen Hulbert & Berghoff LLP

(57) ABSTRACT

An electrostatic device or system includes electrode(s) adapted to produce an electrostatic attraction force and a base surface adapted to facilitate the application of the electrostatic attraction force and also a physical attraction force separate therefrom. The electrostatic and physical attraction forces can maintain a position of the electrostatic device relative to a foreign object via electroadhesion and/or via an additional manner that is separate from the electroadhesion. The physical attraction force can be a vacuum, van der Waals, and/or adhesive force, can be applied at less than all locations across the base surface, and may involve a one-time permanent attachment. The base surface can include a deformable surface portion that moves closer to the foreign object when the electrostatic or physical attraction force is applied. The physical attraction force can be sufficient to adhere the device to the object when the electrostatic attraction force is removed.

17 Claims, 8 Drawing Sheets

ADDITIONAL FORCE AUGMENTED ELECTROADHESION

CROSS-REFERENCE TO RELATED APPLICATION

This application claims priority to U.S. Provisional Patent Application No. 61/549,099, filed Oct. 19, 2011 in the name of Prahlad, et al., and entitled "Electroadhesive Devices With Augmented Capability," which is incorporated by reference herein in its entirety and for all purposes.

GOVERNMENT RIGHTS

This application was made in part with government support under Contract Number HSHQDC-10-C-00118 awarded by the Department of Homeland Security and Contract Number 212-2010-M-34269 awarded by the Center for Disease Control, National Institute of Ocupational Safety and Hazards. The Government has certain rights in this invention.

TECHNICAL FIELD

The present invention relates generally to electroadhesion and other electrostatic applications, and more particularly to electrode materials and uses for such electrostatic applications.

BACKGROUND

Successful controlled adhesion remains a desirable goal in many applications. A success in controlled adhesion might be defined as a technology that is controllable, reliable, safe, and robust enough to provide high mechanical pressure between objects. In some cases, it may be required to provide this mechanical pressure on a sufficient range of ordinary and every day materials. Such ordinary materials can ideally include those having wet, dusty, highly sloped and/or slippery surfaces. Traditional controlled adhesion technologies, such as chemical adhesives and suction cups, suffer from various drawbacks, including permanency, damage to or residue left at the applied surface, leaks, and a limited effectiveness on wet, dusty or irregular surfaces, among others.

The recent use of electroadhesive forces or electrostatic clamping as an alternative in controlled adhesion applications has proven to be advantageous on several levels. Such electroadhesive forces can be adapted to provide controlled adhesion on an electrically controllable basis without leaving residues or damaging surfaces. They can be fast acting in both on and off states, repeatable and strong, thus allowing repeatable modulation of material properties. Furthermore, a wider variety of dusty, slippery or irregular surfaces can be used with electroadhesive forces without detracting from a useful controlled adhesion outcome.

The use of electrostatic forces can also have drawbacks, however, such as limited amounts of adhesion force, the need to apply constant power to maintain adhesion, as well as a tendency toward low peel forces at the perimeter of an electroadhesive clamp that is adhered to a foreign object. Further, any need to be able to hold a load in an electrode power-off condition for a length of time, and also any need to conform to surfaces having high degree of roughness can pose to be problematic in many electroadhesive and electrostatic applications. In these and other electroadhesive applications, the types of electrodes and/or interacting surfaces can play significant roles in the strength, reliability and ready reversability of adherence between separate objects.

Other current approaches to non-permanent and/or reversible attachment of an object to a substrate that do not damage or alter the substrate include relying on van der Waals forces. These forces, which are exploited by natural geckos and more recent "artificial gecko" systems often require the use of a mechanical smoothing (pressure) force when applied to a substrate in order to induce the intimate contact, and as such these systems are typically not well suited to sustain high loads for long periods of time. Other, traditional means of fastening an object to a substrate include such means as nails or screws or adhesives (including tapes), the use of which have the disadvantages of being more permanent and potentially damaging to the substrate.

Although various materials and tools for electrostatic and electroadhesive applications have generally worked well in the past, there is always a desire for improvement. In particular, what is desired are materials and tools for such applications that allow for stronger, more reliable and/or readily reversible adherence between separate objects, without overly demanding requirements with respect to increased voltages, power demands, safety concerns and other electrical details.

SUMMARY

It is an advantage of the present invention to provide systems and techniques involving improved materials and tools for electrostatic and electroadhesive applications. Such systems and techniques can generally present materials and tools for adhesion to foreign objects in many applications that allow for stronger, more reliable and/or readily reversible adherence between separate objects, without overly demanding requirements with respect to increased voltages and power concerns. This can be accomplished in at least in part due to the presence of a particular base surface or other secondary adhesion component that is configured to facilitate the use of a secondary force or manner, such as a separate physical attraction force, in addition to electroadhesion in order to adhere different objects together. In some instances, such a base surface or other adhesion component can include a soft pad material that facilitates multiple modes of adhesion to a foreign object.

In various embodiments, an electroadhesive device can include one or more electrodes and a base surface configured to interact with a foreign object. The one or more electrodes can be adapted to produce collectively an electrostatic attraction force between the electrostatic device and the foreign object, wherein the electrostatic attraction force is suitable to facilitate maintaining a current or given position of the electrostatic device relative to the foreign object. In addition, the base surface can be adapted to facilitate the application of the electrostatic attraction force and also to facilitate maintaining the current position of the electrostatic device relative to the foreign object in a secondary manner, such as by using a physical attraction force that is separate from the electrostatic attraction force.

In various detailed embodiments, the physical attraction force or other secondary manner can involve the use of a vacuum, such as where the base surface has a low durometer surface or coating and is applied to a relatively smooth surface in such a manner that a sealed surface is maintained between the base surface and the foreign object or substrate. In some embodiments, the base surface can be an outer surface of one of the electrodes or a coating on top of the electrode surface (s). In some embodiments, the physical attraction force or secondary manner can involve the use of van der Waals forces, such as where the base surface includes a soft, low durometer coating, a tacky surface, or a plurality of cilia.

In some embodiments, the base surface can include a deformable surface, where at least a portion of the deformable surface moves closer to the foreign object when the electrostatic force is applied or when the separate physical attraction force or other secondary manner is in effect. In addition, the separate physical attraction force or other secondary manner may be sufficient to maintain a current position of the electrostatic device relative to the foreign object for at least some period of time when the electrostatic force is turned off. In various detailed embodiments, the separate physical force or other secondary manner can involve the use of a chemical adhesive, the use of a phase changing material, and/or the use of a one-time permanent attaching feature, such as where the one-time permanent attaching feature can include glue, wax, rubber and/or thermoplastic.

In various other embodiments, an electroadhesive system can include a device having a surface interface area and at least one electrode located proximate to the device, such as at the surface interface area. The at least one electrode can be configured to apply an electrostatic adhesion voltage that produces an electrostatic attraction force between the device and the foreign object that facilitates adhering the device and foreign object together when the electrostatic adhesion voltage is applied. Also, a physical attraction force between the device and foreign object can result from contacting the surface interface area to the foreign object. This physical attraction force can also facilitate adhering the device and foreign object together, such as in combination with the electrostatic attraction force, wherein the physical attraction force is separate from the electrostatic attraction force.

In various detailed embodiment therefrom, the physical attraction force can be a secondary force, and/or can involve vacuum, van der Waals, and/or adhesive forces. Also, the surface interface area can include a deformable surface, wherein at least a portion of the deformable surface moves closer to the opposing first or foreign object when the electrostatic attraction force or the physical attraction force is applied. In some embodiments, the physical attraction force might only be applied at a subset of locations that is less than all locations along the surface interface area. In some embodiments, the electrostatic force, the physical attraction force, or both, are sufficient alone in the absence of the other force to adhere the device and one or more foreign objects together for at least some significant period of time.

In still further embodiments, various methods of physically controlling a foreign object can include the process steps of contacting a base surface to a foreign object, and applying an electrostatic adhesion voltage across one or more electrodes sufficient to generate an electrostatic attraction force through at least a portion of the base surface to the foreign object. The contacting step can result in the creation of a physical attraction force from at least a portion of the base surface to the foreign object. The applying step can result in adhering the base surface to the foreign object surface using the electrostatic attraction force and/or the physical attraction force. Again, the physical attraction force can involve vacuum, van der Waals, and/or adhesive forces. In some instances, the separate physical attraction or secondary force may not require a special application, but can be "automatically" applied by the manner in which the base surface is formed or contacted to the foreign objection.

Additional process steps can include increasing the surface area contact between the base surface and the foreign object after adhering the base surface to the foreign object. This can be done by deforming a deformable surface portion of the base surface such that the deformable surface portion moves closer to the separate foreign object surface. Still further process steps can include reducing or eliminating the electrostatic attraction force after adhering the base surface to the foreign object, and maintaining the adherence of the base surface to the foreign object using only the separate physical attraction force.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive applications and systems utilizing soft pad electrodes for electrostatic applications. These drawings in no way limit any changes in form and detail that may be made to the invention by one skilled in the art without departing from the spirit and scope of the invention.

DETAILED DESCRIPTION

Figure 1A:
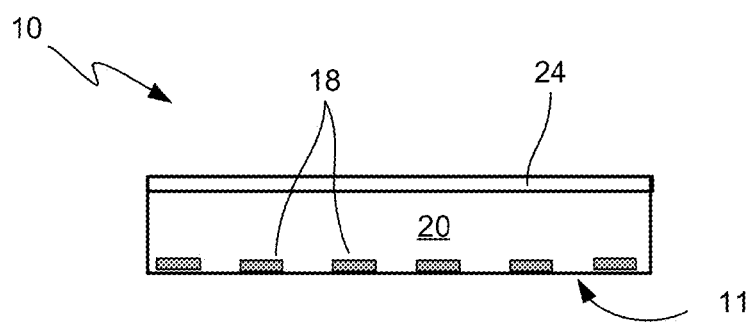
FIG. 1A illustrates in side cross-sectional view an exemplary electroadhesive device.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The present invention relates in various embodiments to systems, devices and methods involving electroadhesive or electrostatic applications. In some embodiments, various electroadhesive or electrostatic systems or devices can include electrodes adapted to deliver an electrostatic force suitable to adhere separate objects together, as well as a base surface or other secondary adhesion component that facilitates the use of a secondary force or manner in addition to the electrostatic force in order to adhere the separate objects together. In some instances, such a base surface or other secondary adhesion component can include a soft pad material having multiple modes of adhesion to a foreign object.

While the various examples disclosed herein focus on particular aspects of specific electroadhesive applications, it will be understood that the various inventive principles and embodiments disclosed herein can be applied to other electrostatic applications and arrangements as well. For example, an electrolaminate application involving one or more electrostatically charged sheets can utilize the same types of electrodes and general electrostatic principles for gripping and controlling foreign objects. Furthermore, while the particular applications described herein are made with respect to relatively smaller or self-contained objects that are adhered to walls or other larger substrates, it will be readily appreciated that the various electrodes and materials therefore provided herein can be used in a variety of other applications that are not necessarily limited to such arrangements or environments.

In addition, while the various examples and discussions set forth herein often refer to a "secondary" force or component in addition to an electroadhesive force or components, it will be readily appreciated that such other forces or components need not be considered "secondary" in all instances. In many instances, it may be more appropriate to consider one type of forces or items as electrostatic or electroadhesive attraction forces or components, and another type of forces or items as separate attraction forces or components that are separate from the electrostatic or electroadhesive types. Such other attraction forces can often be physical in nature, and as such can be referred to as physical attraction forces that can be used to augment the electrostatic or electroadhesion forces.

In providing various details for the contemplated embodiments, the following disclosure provides an initial discussion regarding electroadhesion, followed by a brief description of electrostatic properties, and then various details regarding soft pad materials and other items that can be used to provide augmented forces in addition to electroadhesive attraction forces. A particular method of operating an electroadhesive system having soft pad electrodes is then provided.

Electroadhesion

As the term is used herein, "electroadhesion" refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the traction or friction between two surfaces due to electrostatic forces created by an applied electrical field. Although electrostatic clamping has traditionally been limited to holding two flat, smooth and generally conductive surfaces separated by a highly insulating material together, the present invention involves electroadhesion devices and techniques that do not limit the material properties, curvatures, size or surface roughness of the objects subject to electroadhesive forces and handling. Furthermore, while the various examples and discussions provided herein typically involve electrostatically adhering a robot or other device to a foreign substrate, it will also be understood that many other types of electrostatic applications may also generally be implicated for use with the disclosed invention. For example, two components of the same device may be electrostatically adhered to each other, such as in an electrolaminate or other type of arrangement.

Turning first to FIG. 1A, an exemplary electroadhesive device according to one embodiment of the present invention is illustrated in elevated cross-sectional view. Electroadhesive device 10 includes one or more electrodes 18 located at or near an "electroadhesive gripping surface" 11 thereof, as well as an insulating material 20 between electrodes and a backing 24 or other supporting structural component. For purposes of illustration, electroadhesive device 10 is shown as having six electrodes in three pairs, although it will be readily appreciated that more or fewer electrodes can be used in a given electroadhesive device. Where only a single electrode is used in a given electroadhesive device, a complimentary electroadhesive device having at least one electrode of the opposite polarity is preferably used therewith. With respect to size, electroadhesive device 10 is substantially scale invariant. That is, electroadhesive device sizes may range from less than 1 square centimeter to greater than several meters in surface area. Even larger and smaller surface areas also possible, and may be sized to the needs of a given application.

Figure 1B:
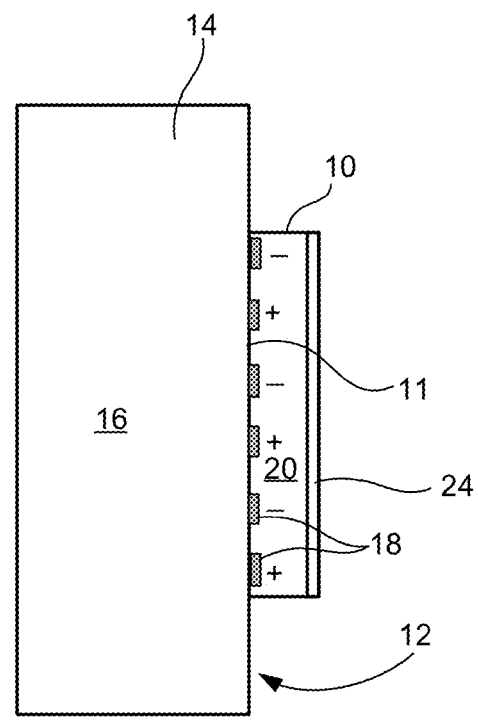
FIG. 1B illustrates in side cross-sectional view the exemplary electroadhesive device of FIG. 1A adhered to a foreign object.

FIG. 1B depicts in elevated cross-sectional view the exemplary electroadhesive device 10 of FIG. 1A adhered to a foreign object 14 according to one embodiment of the present invention. Foreign object 14 includes surface 12 and inner material 16. Electroadhesive gripping surface 11 of electroadhesive device 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As result of the voltage difference between electrodes 18, one or more electroadhesive forces are generated, which electroadhesive forces act to hold the electroadhesive device 10 and foreign object 14 against each other. Due to the nature of the forces being applied, it will be readily appreciated that actual contact between electroadhesive device 10 and foreign object 14 is not necessary. For example, a piece of paper, thin film, or other material or substrate may be placed between electroadhesive device 10 and foreign object 14. Furthermore, although the term "contact" is used herein to denote the interaction between an electroadhesive device and a foreign object, it will be understood that actual direct surface to surface contact is not always required, such that one or more thin objects such as an insulator, can be disposed between an electroadhesive gripping surface and the foreign object. In some embodiments such an insulator between the gripping surface and foreign object can be a part of the device, while in others it can be a separate item or device.

Figure 1C:
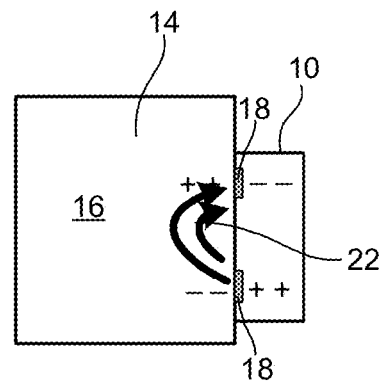
FIG. 1C illustrates in side cross-sectional close-up view an electric field formed in the foreign object of FIG. 1B as result of the voltage difference between electrodes in the adhered exemplary electroadhesive device.

FIG. 1C illustrates in elevated cross-sectional close-up view an electric field formed in the foreign object of FIG. 1B as result of the voltage difference between electrodes in the adhered exemplary electroadhesive device 10. While the electroadhesive device 10 is placed against foreign object 14 and an electrostatic adhesion voltage is applied, an electric field 22 forms in the inner material 16 of the foreign object 14. The electric field 22 locally polarizes inner material 16 or induces direct charges on material 16 locally opposite to the charge on the electrodes 18 of the device, and thus causes electrostatic adhesion between the electrodes 18 (and overall device 10) and the induced charges on the foreign object 14. The induced charges may be the result of a dielectric polarization or from weakly conductive materials and electrostatic induction of charge. In the event that the inner material 16 is a strong conductor, such as copper for example, the induced charges may completely cancel the electric field 22. In this case the internal electric field 22 is zero, but the induced charges nonetheless still form and provide electrostatic force to the device 10. Again, an insulator may also be provided between the device 10 and foreign object 14 in instances where material 16 is copper or another strong conductor.

Thus, the electrostatic adhesion voltage provides an overall electrostatic force, between the electroadhesive device 10 and inner material 16 beneath surface 12 of foreign object 14, which electrostatic force maintains the current position of the electroadhesive device relative to the surface of the foreign object. The overall electrostatic force may be sufficient to overcome the gravitational pull on the foreign object 14, such that the electroadhesive device 10 may be used to hold the foreign object aloft. In various embodiments, a plurality of electroadhesive devices may be placed against foreign object 14, such that additional electrostatic forces against the object can be provided. The combination of electrostatic forces may be sufficient to lift, move, pick and place, or otherwise handle the foreign object, or to provide sufficient traction against the foreign object to enable placing a load on the electroadhesive device (such as for a wall climbing robot). Electroadhesive device 10 may also be attached to other structures and hold these additional structures aloft, or it may be used on sloped or slippery surfaces to increase normal friction forces Removal of the electrostatic adhesion voltages from electrodes 18 ceases the electrostatic adhesion force between electroadhesive device 10 and the surface 12 of foreign object 14. Thus, when there is no electrostatic adhesion voltage between electrodes 18, electroadhesive device 10 can move more readily relative to surface 12. This condition allows the electroadhesive device 10 to move before and after an electrostatic adhesion voltage is applied. Well controlled electrical activation and de-activation enables fast adhesion and detachment, such as response times less than about 50 milliseconds, for example, while consuming relatively small amounts of power. Larger release times may also be valuable in many applications.

Electroadhesive device 10 includes electrodes 18 on an outside surface 11 of an insulating material 20. This embodiment is well suited for controlled attachment to insulating and weakly conductive inner materials 14 of various foreign objects 16. Other electroadhesive device 10 relationships between electrodes 18 and insulating materials 20 are also contemplated and suitable for use with a broader range of materials, including conductive materials. For example, a thin electrically insulating material (not shown) can be located on the surfaces of the electrodes where surface 12 is on a metallic object. As will be readily appreciated, a shorter distance between surfaces 11 and 12 results in a stronger electroadhesive force between the objects. Accordingly, a deformable surface 11 adapted to at least partially conform to the surface 12 of the foreign object 14 can be used.

As the term is used herein, an electrostatic adhesion voltage refers to a voltage that produces a suitable electrostatic force to couple electroadhesive device 10 to a foreign object 14. The minimum voltage needed for electroadhesive device 10 will vary with a number of factors, such as: the size of electroadhesive device 10, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and the relevant gaps between electrodes and foreign object surface. In one embodiment, the electrostatic adhesion voltage includes a differential voltage between the electrodes 18 that is between about 500 volts and about 15 kilovolts. Even lower voltages may be used in micro applications. In one embodiment, the differential voltage is between about 2 kilovolts and about 5 kilovolts. Voltage for one electrode can be zero. Alternating positive and negative charges may also be applied to adjacent electrodes 18. The voltage on a single electrode may be varied in time, and in particular may be alternated between positive and negative charge so as to not develop substantial long-term charging of the foreign object. The resultant clamping forces will vary with the specifics of a particular electroadhesive device 10, the material it adheres to, any particulate disturbances, surface roughness, and so forth. In general, electroadhesion as described herein provides a wide range of clamping pressures, generally defined as the attractive force applied by the electroadhesive device divided by the area thereof in contact with the foreign object The actual electroadhesion forces and pressure will vary with design and a number of factors. In one embodiment, electroadhesive device 10 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and foreign object surface, although other relevant factors may also be manipulated as desired.

Although electroadhesive device 10 having electroadhesive gripping surface 11 of FIG. 1A is shown as having six electrodes 18, it will be understood that a given electroadhesive device or gripping surface can have just a single electrode. Furthermore, it will be readily appreciated that a given electroadhesive device can have a plurality of different electroadhesive gripping surfaces, with each separate electroadhesive gripping surface having at least one electrode and being adapted to be placed against or in close proximity to the foreign object to be gripped. Although the terms electroadhesive device, electroadhesive gripping unit and electroadhesive gripping surface are all used herein to designate electroadhesive components of interest, it will be understood that these various terms can be used interchangeably in various contexts. In particular, while a given electroadhesive device might comprise numerous distinct "gripping surfaces," these different gripping surfaces might themselves also be considered separate "devices" or alternatively "end effectors."

Figure 2A:
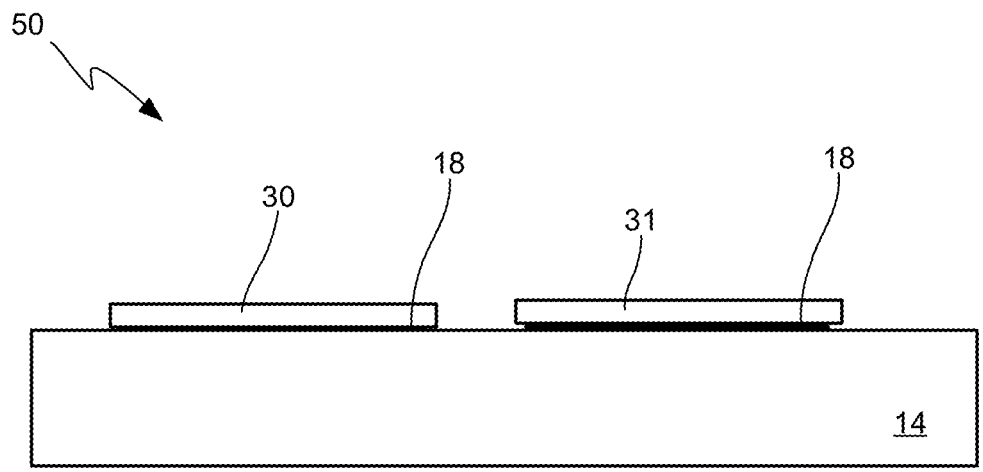
FIG. 2A illustrates in side cross-sectional view an exemplary pair of electroadhesive gripping surfaces or devices having single electrodes thereon.
Figure 2B:
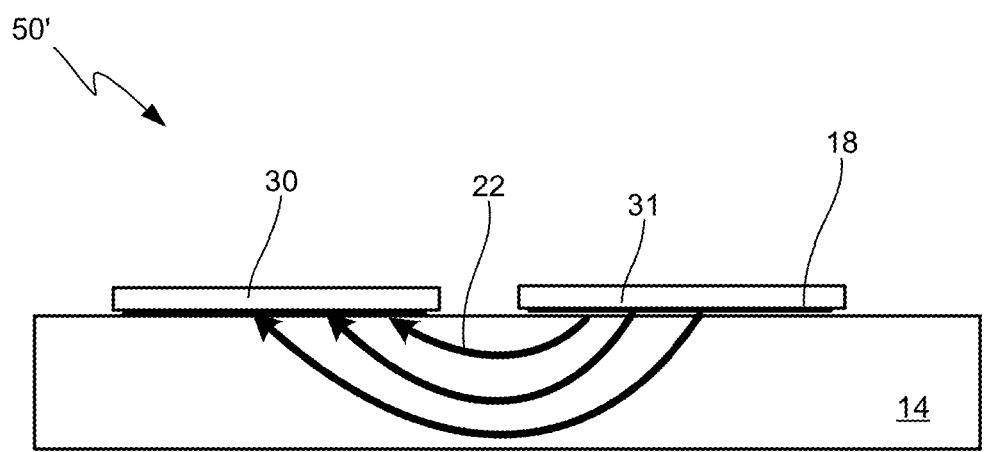
FIG. 2B illustrates in side cross-sectional view the exemplary pair of electroadhesive gripping surfaces or devices of FIG. 2A with voltage applied thereto.

Referring to FIGS. 2A and 2B, an exemplary pair of electroadhesive devices or gripping surfaces having single electrodes thereon is shown in side cross-sectional view. FIG. 2A depicts electroadhesive gripping system 50 having electroadhesive devices or gripping surfaces 30, 31 that are in contact with the surface of a foreign object 16, while FIG. 2B depicts activated electroadhesive gripping system 50' with the devices or gripping surfaces having voltage applied thereto. Electroadhesive gripping system 50 includes two electroadhesive devices or gripping surfaces 30, 31 that directly contact the foreign object 14. Each electroadhesive device or gripping surface 30, 31 has a single electrode 18 coupled thereto. In such cases, the electroadhesive gripping system can be designed to use the foreign object as an insulation material. When voltage is applied, an electric field 22 forms within foreign object 14, and an electrostatic force between the electroadhesive devices or gripping surfaces 30, 31 and the foreign object is created. Various embodiments that include numerous of these single electrode electroadhesive devices can be used, as will be readily appreciated.

In some embodiments, an electroadhesive gripping surface can take the form of a flat panel or sheet having a plurality of electrodes thereon. In other embodiments, the gripping surface can take a fixed shape that is matched to the geometry of the foreign object most commonly lifted or handled. For example, a curved geometry can be used to match the geometry of a cylindrical paint can or soda can. The electrodes may be enhanced by various means, such as by being patterned on an adhesive device surface to improve electroadhesive performance, or by making them using soft or flexible materials to increase compliance and thus conformance to irregular surfaces on foreign objects.

Figure 3A:
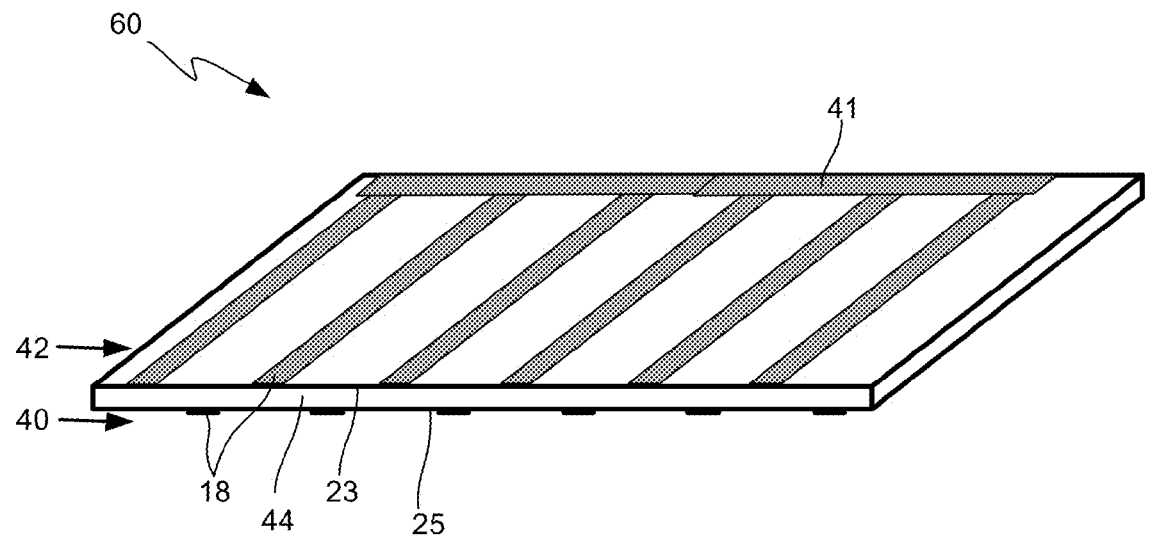
FIG. 3A illustrates in top perspective view an exemplary electroadhesive gripping surface in the form of a sheet with electrodes patterned on top and bottom surfaces thereof.
Figure 3B:
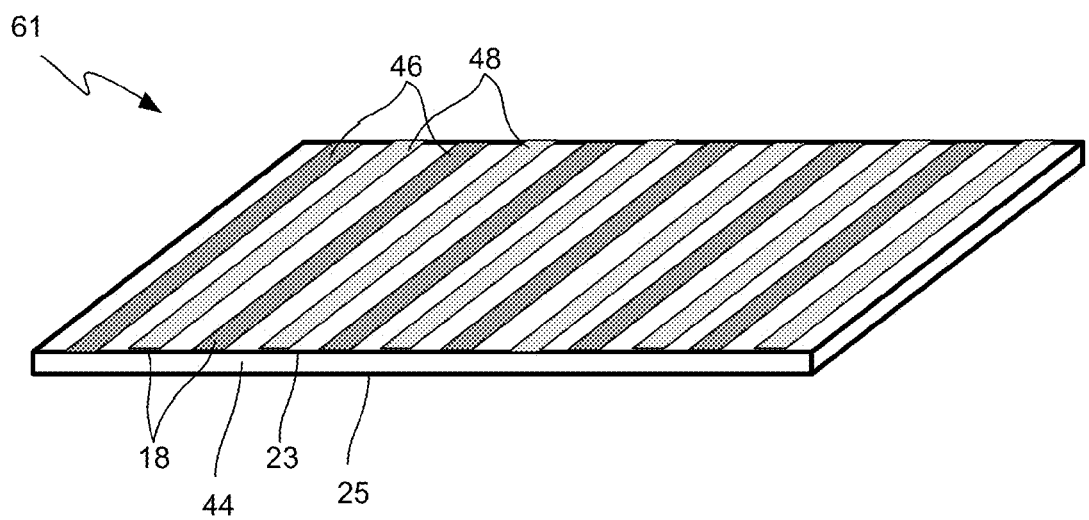
FIG. 3B illustrates in top perspective view an alternative exemplary electroadhesive gripping surface in the form of a sheet with electrodes patterned on a single surface thereof.

Continuing with FIGS. 3A and 3B, two examples of electroadhesive gripping surfaces in the form of flat panels or sheets with electrodes patterned on surfaces thereof are shown in top perspective view. FIG. 3A shows electroadhesive gripping surface 60 in the form of a sheet or flat panel with electrodes 18 patterned on top and bottom surfaces thereof. Top and bottom electrodes sets 40 and 42 are interdigitated on opposite sides of an insulating layer 44. In some cases, insulating layer 44 can be formed of a stiff or rigid material. In some cases, the electrodes as well as the insulating layer 44 may be compliant and composed of a polymer, such as an acrylic or polyurethane elastomer, to increase compliance. In one preferred embodiment the modulus of the polymer is below about 10 MPa and in another preferred embodiment it is more specifically below about 1 MPa. Various types of compliant electrodes suitable for use with the present invention are generally known, and examples are described in commonly owned U.S. Pat. No. 7,034,432, which is incorporated by reference herein in its entirety and for all purposes.

Electrode set 42 is disposed on a top surface 23 of insulating layer 44, and includes an array of linear patterned electrodes 18. A common electrode 41 electrically couples electrodes 18 in set 42 and permits electrical communication with all the electrodes 18 in set 42 using a single input lead to common electrode 41. Electrode set 40 is disposed on a bottom surface 25 of insulating layer 44, and includes a second array of linear patterned electrodes 18 that is laterally displaced from electrodes 18 on the top surface. Bottom electrode set 40 may also include a common electrode (not shown). Electrodes can be patterned on opposite sides of an insulating layer 44 to increase the ability of the electroadhesive end effector 60 to withstand higher voltage differences without being limited by breakdown in the air gap between the electrodes, as will be readily appreciated.

Alternatively, electrodes may also be patterned on the same surface of the insulating layer, such as that which is shown in FIG. 3B. As shown, electroadhesive gripping surface 61 comprises a sheet or flat panel with electrodes 18 patterned only on one surface thereof. Electroadhesive gripping surface 61 can be substantially similar to electroadhesive gripping surface 60 of FIG. 3A, except that electrodes sets 46 and 48 are interdigitated on the same surface 23 of a compliant insulating layer 44. No electrodes are located on the bottom surface 25 of insulating layer 44. This particular embodiment decreases the distance between the positive electrodes 18 in set 46 and negative electrodes 18 in set 48, and allows the placement of both sets of electrodes on the same surface of electroadhesive gripping surface 61. Functionally, this eliminates the spacing between the electrodes sets 46 and 48 due to insulating layer 44, as in embodiment 60. It also eliminates the gap between one set of electrodes (previously on bottom surface 25) and the foreign object surface when the top surface 23 adheres to the foreign object surface. Although either embodiment 60 or 61 can be used, these changes in the latter embodiment 61 do increase the electroadhesive forces between electroadhesive gripping surface 61 and the subject foreign object to be handled.

Figure 4A:
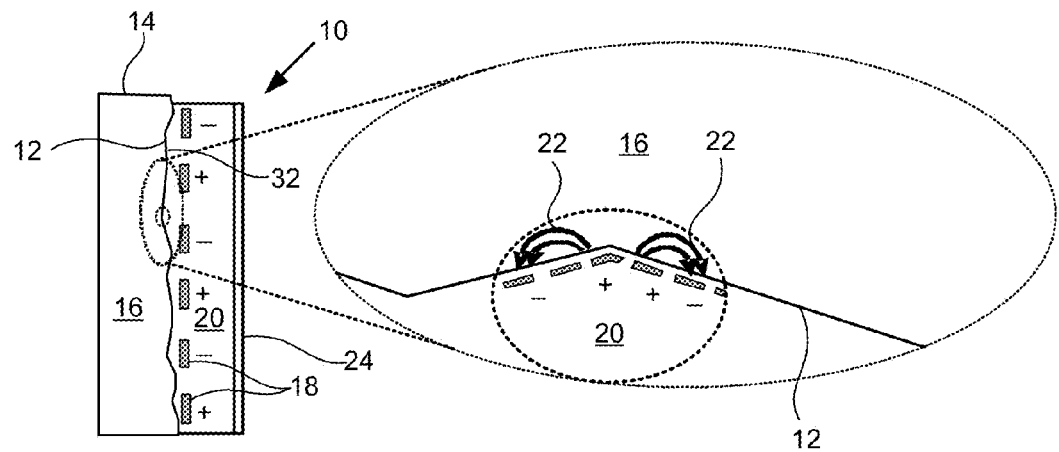
FIG. 4A illustrates in side cross-sectional regular and close-up views a deformable electroadhesive device conforming to the shape of a rough surface according to one embodiment of the present invention.
Figure 4B:
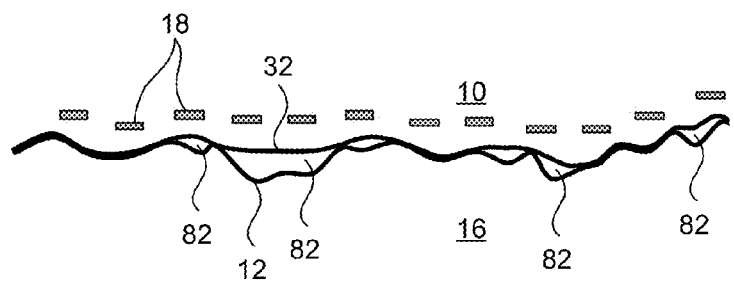
FIG. 4B illustrates in partial side cross-sectional view a surface of a deformable electroadhesive device initially when the device is brought into contact with a surface of a structure according to one embodiment of the present invention.
Figure 4C:
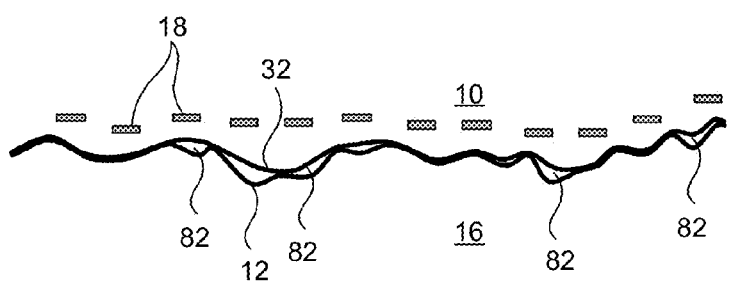
FIG. 4C illustrates in partial side cross-sectional view the surface shape of electroadhesive device of FIG. 4B and wall surface after some deformation in the electroadhesive device due to the initial force of electrostatic attraction and compliance according to one embodiment of the present invention.

Another distinguishing feature of electroadhesive devices described herein is the option to use deformable surfaces and materials in electroadhesive device 10 as shown in FIGS. 4A-4C. In one embodiment, one or more portions of electroadhesive device 10 are deformable. In a specific embodiment, this includes surface 32 on device 10. In another embodiment, insulating material 20 between electrodes 18 is deformable. Electroadhesive device 10 may achieve the ability to deform using material compliance (e.g., a soft material as insulating material 20) or structural design (e.g., see cilia or hair-like structures). In a specific embodiment, insulating material 20 includes a bendable but not substantially elastically extendable material (for example, a thin layer of mylar). In another embodiment insulating material 20 is a soft polymer with modulus less than about 10 MPa and more specifically less than about 1 MPa. Stiffer or softer materials can also be readily used, depending on the particular application.

Electrodes 18 may also be compliant. Compliance for insulating material 20 and electrodes 18 may be used in any of the electroadhesive device arrangements 10 described above. Compliance in electroadhesive device 10 permits an adhering surface 32 of device 10 to conform to surface 12 features of the object it attaches to. Compliance can also be related to the ability to passively adhere to foreign objects using van der Waals forces. FIG. 4A shows a compliant electroadhesive device 10 conforming to the shape of a rough surface 12 in accordance with a specific embodiment of the present invention.

Adhering surface 32 is defined as the surface of an electroadhesive device that contacts the substrate surface 12 being adhered to. The adhering surface 32 may or may not include electrodes. In one embodiment, adhering surface 32 includes a thin and compliant protective layer that is added to protect electrodes that would otherwise be exposed. In another embodiment, adhering surface 32 includes a material that avoids retaining debris stuck thereto (e.g., when electrostatic forces have been removed). Alternatively, adhering surface 32 may include a sticky or adhesive material to help adhesion to a wall surface or a high friction material to better prevent sliding for a given normal force.

Compliance in electroadhesive device 10 often improves adherence. When both electrodes 18 and insulating material 20 are able to deform, the adhering surface 32 may conform to the micro- and macro-contours of a rough surface 12, both initially and dynamically after initial charge has been applied. This dynamic compliance is described in further detail with respect to FIG. 4B. This surface electroadhesive device 10 compliance enables electrodes 18 get closer to surface 12, which increases the overall clamping force provided by device 10. In some cases, electrostatic forces may drop off with distance (between electrodes and the wall surface) squared. The compliance in electroadhesive device 10, however, permits device 10 to establish, dynamically improve and maintain intimate contact with surface 14, thereby increasing the applied holding force applied by the electrodes 18. The added compliance can also provide greater mechanical interlocking on a micro scale between surfaces 12 and 32 to increase the effective friction and inhibit sliding.

The compliance permits electroadhesive device 10 to conform to the wall surface 12 both initially—and dynamically after electrical energy has been applied. This dynamic method of improving electroadhesion is shown in FIGS. 4B and 4C in accordance with another embodiment of the present invention. FIG. 4B shows a surface 32 of electroadhesive device 10 initially when the device 10 is brought into contact with surface 12 of a structure with material 16. Surface 12 may include roughness and non-uniformities on a macro, or visible, level (for example, the roughness in concrete can easily be seen) and a microscopic level (most materials).

At some time when the two are in contact as shown in FIG. 4B, electroadhesive electrical energy is applied to electrodes 18. This creates a force of attraction between electrodes 18 and wall surface 12. However, initially, as a practical matter for most rough surfaces, as can be seen in FIG. 4B, numerous gaps 70 are present between device surface 32 and wall surface 12. The number and size of these gaps 70 affects electroadhesive clamping pressures. For example, at macro scales electrostatic clamping is inversely proportional to the square of the gap between the substrate 16 and the charged electrodes 18. Also, a higher number of electrode sites allows device surface 32 to conform to more local surface roughness and thus improve overall adhesion. At micro scales, though, the increase in clamping pressures when the gap is reduced is even more dramatic. This increase is due to Paschen's law, which states that the breakdown strength of air increases dramatically across small gaps. Higher breakdown strengths and smaller gaps imply much higher electric fields and therefore much higher clamping pressures. Clamping pressures may be increased, and electroadhesion improved, by using a compliant surface 32 of electroadhesive device 10, or an electroadhesion mechanism that conforms to the surface roughness.

When the force of attraction overcomes the compliance in electroadhesive device 10, these compliant portions deform and portions of surface 32 move closer to surface 12. This deformation increases the contact area between electroadhesive device 10 and wall surface 12, increases electroadhesion clamping pressures, and provides for stronger electroadhesion between device 10 and wall 14. FIG. 4C shows the surface shape of electroadhesive device 10 and wall surface 12 after some deformation in electroadhesive device 10 due to the initial force of electrostatic attraction and compliance. Many of the gaps 70 have become smaller.

This adaptive shaping may continue. As the device surface 32 and wall surface 12 get closer, the reducing distance therebetween in many locations further increases electroadhesion forces, which causes many portions of electroadhesive device 10 to further deform, thus bringing even more portions of device surface 32 even closer to wall surface 12. Again, this increases the contact area, increases clamping pressures, and provides for stronger electroadhesion between device 10 and wall 14. The electroadhesive device 10 reaches a steady state in conformity when compliance in the device prevents further deformation and device surface 32 stops deforming.

In some embodiments, electroadhesive device 10 includes porosity in one or more of electrodes 18, insulating material 20 and backing 24. Pockets of air may be trapped between surface 12 and surface 32; these air pockets may reduce adaptive shaping. Tiny holes or porous materials for insulator 20, backing 24, and/or electrodes 18 allows trapped air to escape during dynamic deformation. Thus, electroadhesive device 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters.

An optional backing structure 24, such as shown in FIGS. 1A and 4A, can attach to insulating material 20 and include a rigid or non-extensible material. Backing layer or structure 24 can provide structural support for the compliant electroadhesive device. Backing layer 24 also permits external mechanical coupling to the electroadhesive device to permit the device to be used in larger devices, such as wall-crawling robots and other devices and applications.

With some electroadhesive devices 10, softer materials may warp and deform too much under mechanical load, leading to suboptimal clamping. To mitigate these effects, electroadhesive device 10 may include a graded set of layers or materials, where one material has a low stiffness or modulus for coupling to the wall surface and a second material, attached to a first passive layer, which has a thicker and/or stiffer material. Backing structure 24 may attach to the second material stiffer material. In a specific embodiment, electroadhesive device 10 included a polyurethane elastomer of thickness approximately 50 microns as the softer layer and a thicker polyurethane elastomer of thickness 1000 microns as the second support layer. Other thicknesses may be used. Further, other materials, such as acrylics, may also be used.

The time it takes for the changes of FIGS. 4B and 4C may vary with the electroadhesive device 10 materials, electroadhesive device 10 design, the applied control signal, and magnitude of electroadhesion forces. The dynamic changes can be visually seen in some electroadhesive devices. In one embodiment, the time it takes for device surface 32 to stop deforming can be between about 0.01 seconds and about 10 seconds. In other cases, the conformity ceasing time is between about 0.5 second and about 2 seconds.

In some embodiments, electroadhesion as described herein permits fast clamping and unclamping times and may be considered almost instantaneous. In one embodiment, clamping or unclamping may be achieved in less than about 50 milliseconds. In a specific embodiment, clamping or unclamping may be achieved in less than about 10 milliseconds. The speed may be increased by several means. If the electrodes are configured with a narrower line width and closer spacing, then speed is increased using conductive or weakly conductive substrates because the time needed for charge to flow to establish the electroadhesive forces is reduced (basically the "RC" time constant of the distributed resistance-capacitance circuit including both electroadhesive device and substrate is reduced). Using softer, lighter, more adaptable materials in device 10 will also increase speed. It is also possible to use higher voltage to establish a given level of electroadhesive forces more quickly, and one can also increase speed by overdriving the voltage temporarily to establish charge distributions and adaptations quickly. To increase unclamping speeds, a driving voltage that effectively reverses polarities of electrodes 18 at a constant rate may be employed. Such a voltage prevents charge from building up in substrate material 16 and thus allows faster unclamping. Alternatively, a moderately conductive material 20 can be used between the electrodes 18 to provide faster discharge times at the expense of some additional driving power required.

Various additional details and embodiments regarding electroadhesion, electrolaminates, electroactive polymers, wall-crawling robots, and applications thereof can be found at, for example, U.S. Pat. Nos. 6,586,859; 6,911,764; 6,376,971; 7,411,332; 7,551,419; 7,554,787; and 7,773,363; as well as International Patent Application No. PCT/US2011/029101; and also U.S. patent application Ser. No. 12/762,260, each of the foregoing of which is incorporated by reference herein.

Soft Pad Materials

While the foregoing electroadhesive and electrostatic devices and systems are generally adequate for many applications, further improvements can also be quite useful. In many instances where electroadhesion is the only way by which two objects are being adhered, for example, then power loss, edge peeling and/or other issues can cause a loss of adhesion and possible failure. In certain applications, it may be helpful to conserve power during the attachment duration by providing a one-time power burst to initiate attachment with little or no power then to maintain attachment. Furthermore, the need for relatively high voltages to result in adequate electroadhesive forces can result in design constraints and greater chances for something to go wrong. In some arrangements then, the use of some secondary adhesion component, feature, or manner of adhesion in addition to the electroadhesion components and features can be beneficial.

Such arrangements can include the use of specialized materials, such as soft overlying dielectric insulator pads that facilitate electroadhesive attraction as well as other modes of attraction or adhesion between different objects. Specialized materials or methods of adhesion or attraction that allow for multiple modes of attraction or adherence between objects can result in stronger, more reliable and/or readily reversible adherence between separate objects, without overly demanding requirements with respect to increased voltages, high or constant power demands, safety concerns and other electrical details. Such specialized electrodes can involve the use of very low modulus materials (to provide vacuum or van der Waals forces), "artificial gecko" hairs (to provide van der Waals type forces), permanent adhesives such as UV curable or heat activated adhesives, or other similarly helpful materials and/or features in this regard.

In general, various approaches in using such specialized electrodes, interface layers, and/or other associated components that result in multiple modes of adherence or attraction can be to use very low modulus materials (e.g., 100 MPa or below or Shore 100 on A scale or below), or hairs such as gecko hairs to take advantage of van-der-waals forces, in addition to electroadhesion on a weight-holding device having a soft pad-like surface. In some applications, electroadhesion can act as a "switch" that forces the pad material into very close and uniform contact with the substrate without the typical need for a mechanical pressing or smoothing force. Once the "soft pad" electrode or interface layer is in intimate contact, a lot of the load bearing capacity can then come from van-der-waals forces or surface to surface adhesion forces, which are generally mechanical or passive in nature (i.e., not electrically applied). Electroadhesion can also keep the surfaces pressed together for a long period of time, which might not be possible if pursuing only the passive approach. Such a "soft pad" electrode or interface may also include a rigid or inelastic (but flexible in bending) backing material.

In addition, one can use weak glue materials or meltable glues at the pad-substrate interface to increase adhesion and/or conformity with the substrate. In such cases, the electroadhesive electrodes can also include high-resistance electrodes or discrete heater coils embedded along with them. The material on top of these electrodes can be monolithic (i.e., the entire layer melts when the heater coils are energized), or they can be discrete materials formed directly overlapping with the heater electrodes (such as where the material on top of the rest of the electroadhesive electrode is optimized for electroadhesion and the material on top of the heater electrode is optimized for its melting or adhesive properties). Such a combined arrangement may be useful in robotic attachment to a foreign body. A reversible attachment may be advantageous when the attachment is first made, so that it can be switched off and repositioned if necessary. Once the right attachment position is confirmed, a thermoplastic material can be melted in a few places to make a permanent secure attachment. The electroadhesive forces may help with the bonding of the thermoplastic by maintaining pressure through the cure process. Other modes of curing, such as ultraviolet or moisture, can also be used in conjunction with electroadhesion.

The various embodiments and variations thereof described herein provide exemplary devices and systems that can be easy to install, as well as methods to hold relatively much stronger loads, even at an offset distance of few inches away from the electroadhesive soft pad, while also having the ability to hold or adhere with the power off during pulse cycling or even over a certain extended period of time. These embodiments enable a range of new applications, such as, for example, temporary exhibits of merchandise in a store, art in a gallery or museum, holiday decorations in a home, holding items in place during construction or fabrication processes, attaching tracking devices for surveillance, as well as others too numerous to list here.

Figure 5A:
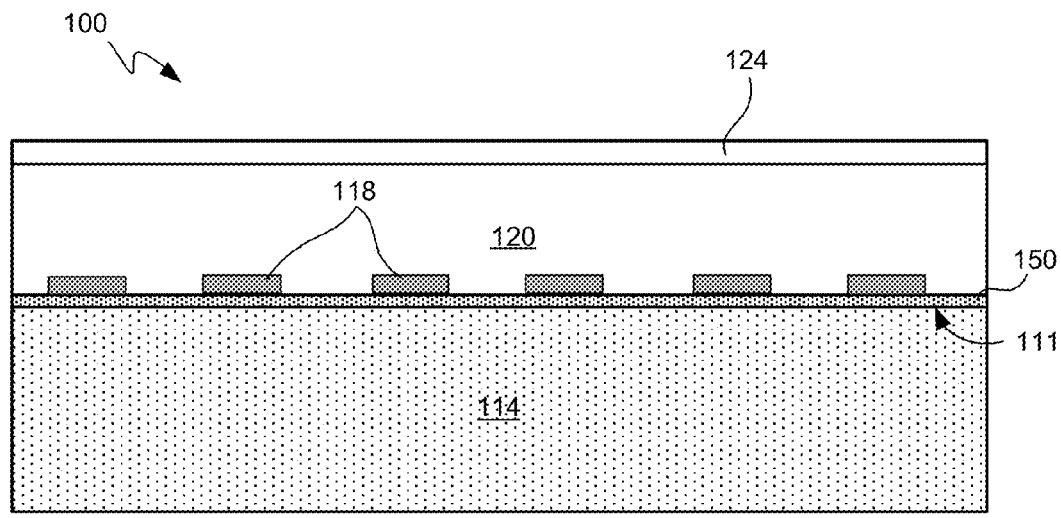
FIG. 5A illustrates in elevated cross-sectional view an exemplary electroadhesive device having a base surface adhered to a foreign object according to one embodiment of the present invention.

Turning next to FIG. 5A, an exemplary electroadhesive device having a base surface adhered to a foreign object according to one embodiment is illustrated in elevated cross-sectional view. Electroadhesive device 100 can have a number of components that facilitate adherence to foreign object or substrate 114, and it will be readily appreciated that the orientation, alignment and/or arrangement of the device and foreign object can vary in numerous other ways. The electroadhesive device 100 can include various optional components, such as a bendable but not extendable backing plate 124. In some embodiments, backing plate 124 can be, for example, about 0.005 to 0.25 inches thick, with a Young's modulus of about 10-10,000 MPa. In addition, an optional filler material 120 can be used between backing plate 124 and surface 111, and arranged to surround one or more electrodes 118, which electrode(s) are adapted to generate an electroadhesive force, as noted above. Optional filler material 120 can similarly be, for example, about 0.005 to 0.25 inches thick, with a Young's modulus of about 10-10,000 MPa.

Electroadhesive device 100 can also include an interface layer 150 formed from a relatively soft semiconductor or insulator material, which is adapted to conform to the minute surface features on the foreign object or substrate 114. In some embodiments, interface layer can be, for example, about 0.005 to 0.25 inches thick, with a Young's modulus of about 10-1000 MPa. Specific material examples for such an interface layer can include, for example, quick casting polyurethane resins from Tap Plastics, proprietary low durometer polymers such as Sorbothane®, or silicones with conductive fillers or nitrile rubbers, among other possibilities. In various embodiments, such as where interface layer 150 directly contacts the foreign object or substrate 114, this interface layer can function as a base surface that interacts with the foreign object, is adapted to facilitate the application of the electrostatic force, and is also adapted to facilitate maintaining the current position of the electrostatic device relative to the foreign object in a secondary manner that is separate from the electrostatic force. Such a secondary manner or force can involve suction or a vacuum, van der Waals, and/or glue or other adhesive forces.

In some embodiments, an optional interface material 111 can be located right at the bottom surface of interface layer 150, such that this optional interface material directly contacts the surface of foreign object or substrate 114, and thus all the features and irregularities on that surface. Optional surface material can include, for example, a low durometer coating, such as silicone, "artificial gecko" like hairs, a relatively weak glue or other adhesive, a meltable adhesive, a phase changing adhesive material, or any of a number of other possible materials. Such an optional surface material on top of these electrodes can be monolithic. In such cases, the material can be optimized for the combination of electroadhesion and the secondary force. For example, the material can be mildly conductive for best electroadhesive performance and low durometer for higher van der Waals forces. Alternatively, the filler material or interface materials can be discrete materials that are composite and formed next to each other. For example, the material directly overlapping with heater electrodes can be optimized for melting and physical adhesion, while the rest of the material above the electroadhesive electrode is optimized for electroadhesion.

Figure 5B:
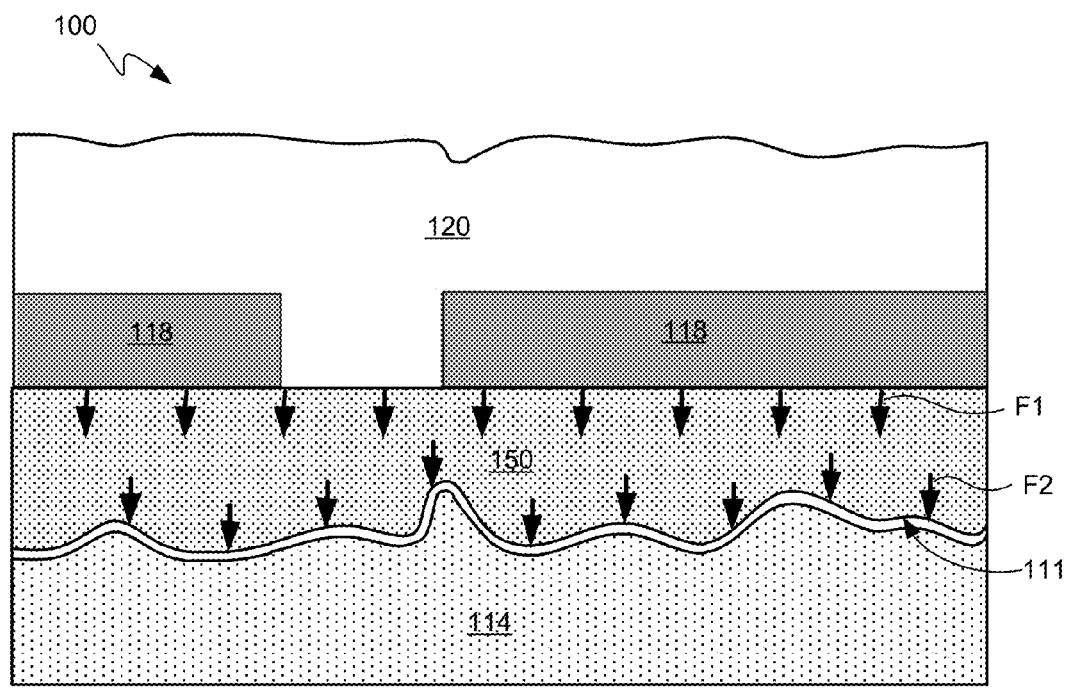
FIG. 5B illustrates in close-up elevated cross-sectional view the exemplary electroadhesive device having a base surface and foreign object of FIG. 5A according to one embodiment of the present invention.

Moving next to FIG. 5B, the exemplary electroadhesive device having a base surface of FIG. 5A is shown in close-up elevated cross-sectional view. In particular, various surface features and irregularities that may be naturally or ordinarily found on foreign object or substrate 114 may be somewhat exaggerated for purposes of discussion. Again, electroadhesion forces can be generated between device 100 and the foreign object 114 by way of one or more electrodes 118. Such electrostatic forces are generally shown in FIG. 5B as F1, which represents the electrostatic force caused between the entire device 100 and object 114 caused by voltage differences across the electrode(s) 118. In addition, one or more secondary forces are generally shown as F2, which can be caused in one or more additional manners or mechanisms. For example, F2 forces can be vacuum forces where a low durometer rubber or silicone is used as a contact material, van der Waals forces that are caused due to gecko like hairs as a contact material, or adhesion forces due to a relatively weak glue, such as that used on Post-It Notes® by 3M, or due to a meltable or other phase changing adhesive, such as wax.

In such embodiments involving a surface adhesion force F2, the electroadhesion force F1 can enhance or increase the passive force F2 without the application of mechanical smoothing, mechanical pressure, or other types of mechanical interaction that are typically required for such F2 forces. Furthermore, the surface adhesion force F2 is additive to the electroadhesion force F1, and as such the combination of F1 and F2 provides offers better coupling or adhesion to the foreign object or substrate 114. In addition, embodiments that include an optional surface interface material 111 or other surface feature such as a glue, other adhesive, gecko like hairs, elastomer, or the like, such material or materials tends to fill in any small cavities or spaces between the device and the foreign object.

In addition, in order to achieve better electroadhesion forces where a relatively thick insulator material is used for interface layer 150, certain electrical properties may be preferable for such an insulator material. In particular, a bulk resistance of 1 Mohm-m to 100 Gohm-m, and a surface resistance of more than $10^{13}$ ohms/square may be preferable. Furthermore, without wishing to be bound by theory, these electrical properties may allow the electrodes to transmit their voltages closer to the substrate surface, thus allowing Johnson-Rahbeck effect electrostatic clamping even with thick (50-1000 micrometer) insulation interface layers 150.

Figure 6:
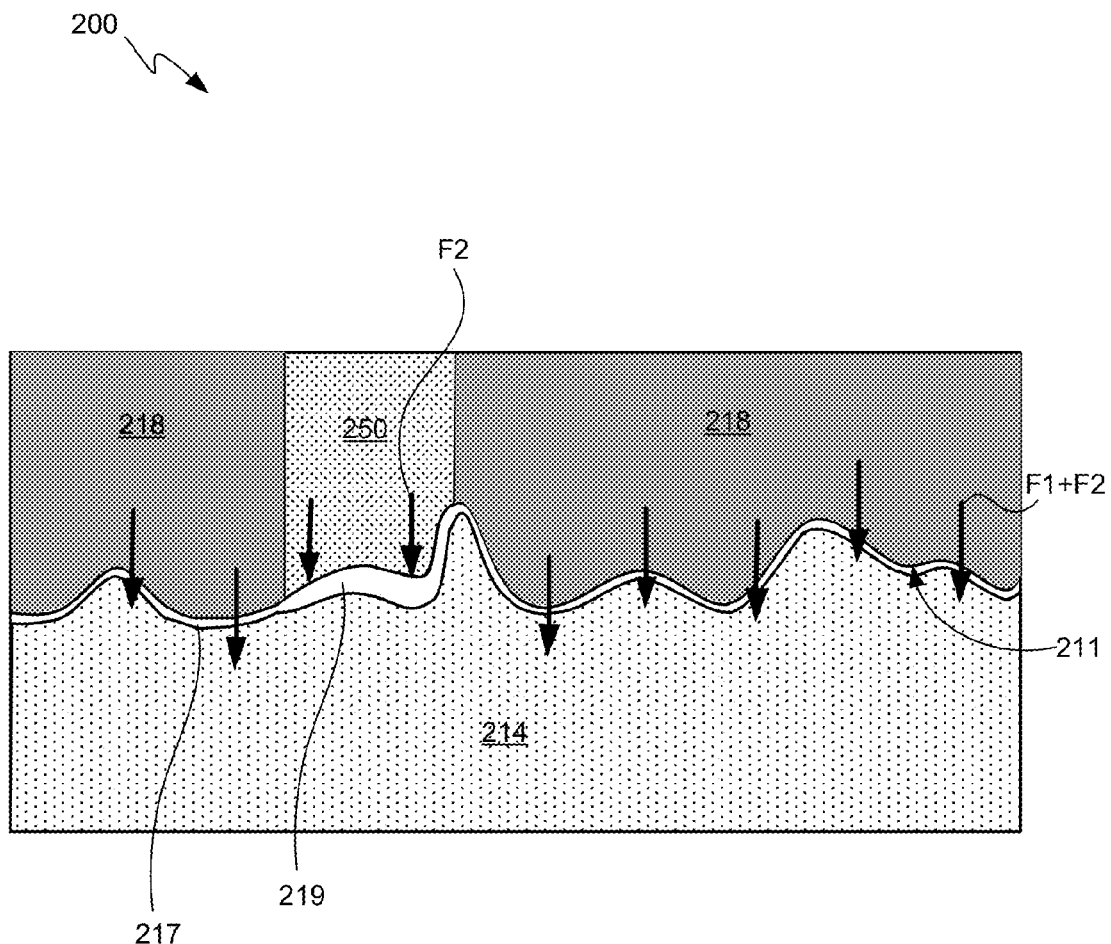
FIG. 6 illustrates in close-up elevated cross-sectional view an exemplary alternative electroadhesive device having electrodes with base surfaces adhered to a foreign object according to one embodiment of the present invention.

Continuing with FIG. 6, an exemplary alternative electroadhesive device having electrodes with base surfaces adhered to a foreign object is also depicted in close-up elevated cross-sectional view. Electroadhesive device or system 200 is similar to electroadhesive device or system 100 above, in that it has one or more electrodes 218 adapted to generate electroadhesive forces F1 between the device or system 200 and a foreign object or substrate 214. Again, various surface features and irregularities that may be naturally or ordinarily found on foreign object or substrate 214 may be somewhat exaggerated for purposes of illustration. Unlike the foregoing embodiment 100, however, device 200 includes one or more electrodes 218 that can directly contact the foreign object 214. In effect, electrodes 218 can be embedded within interface material 250.

Although somewhat different since the electrode(s) 218 can directly contact the foreign object 214 and/or be embedded within an interface material 250, device 200 is similarly arranged to result in one or more secondary forces F2, which can again be caused in one or more additional manners or mechanisms. Such additional manners or mechanism can be the same or similar to those described above, and can be in the form of an optional thin surface interface material or feature 211, such as glue, gecko hairs, low durometer rubbers or silicones, and the like. Such materials or features 211 can be located at the surfaces of both the electrodes 218 and the interface material 250 that may be between the electrodes. As shown, secondary forces F2 might then occur all across the surface interface between device 200 and foreign object 214, while electroadhesive forces F1 might only occur at or near where electrodes 218 located. As will be readily appreciated, in the event that electrodes 218 are spaced closely enough together, F1 forces might exist at all locations as well.

Due to the addition of significant F2 type adhesion forces in both of the foregoing embodiments, as well as numerous other suitable alternative embodiments that will be readily appreciated, the ability to provide, vary, increase, pulse and otherwise manipulate or even remove the electrostatic or electroadhesion voltage or associated power source without an overall loss of adhesion can advantageously be observed. In fact, an electroadhesion voltage could be applied in a much wider variety of ways given the presence of such F2 secondary forces. For example, the electroadhesion voltage could be applied continuously (as in a traditional manner), applied only initially at the time of attachment (and then removed), applied intermittently, such as pulsed at a set frequency or on demand upon a feedback sensing of a weakening F2 force, or in some combination of ways.

For example, with intermittent use of electroadhesion forces (i.e., F1), these forces could be just enough to maintain the higher end of the secondary force (i.e., F2). As a particular example, the Command™ type hooks by 3M can provide an F2 type force, but come with a warning that the hooks may come undone under too heavy a load. In such instances, an intermittent application of an electroadhesive force (F1) would increase the likelihood that such a hook stays on the wall. As another example of attachment using purely van der Waals forces (F2), continuous loading can cause deformation in soft materials. While this can in turn ordinarily result in gradual detachment over time, the application of an added electroadhesive force (F1) could press the material such that it remains in intimate contact with the substrate at all times. As yet another example, a meltable glue arrangement can involve an electroadhesive force (F1) that causes an added glue (F2) to flow and fill in the cavities and gaps between surface features on the foreign object 214.

Figure 7A:
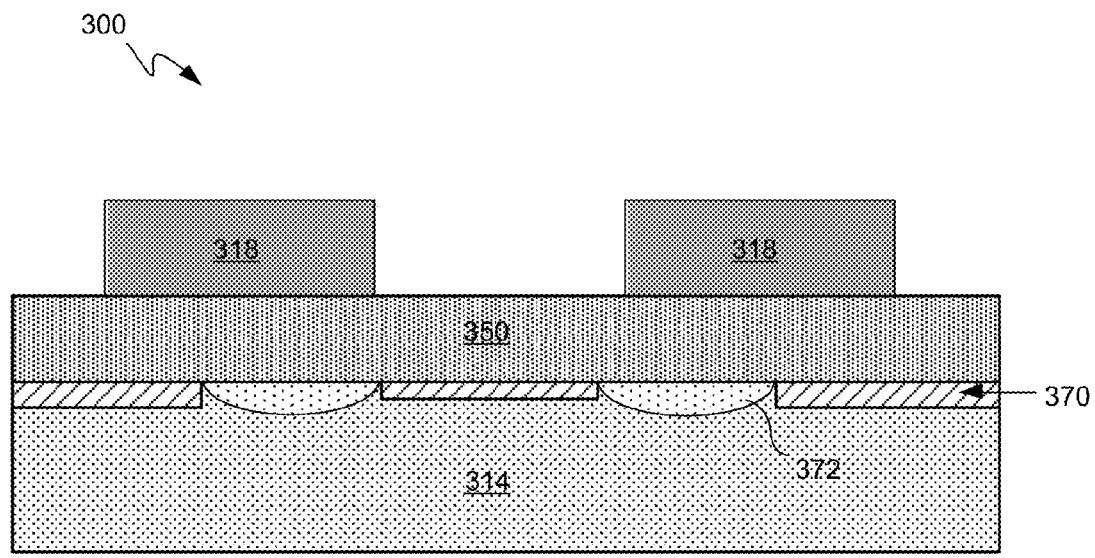
FIG. 7A illustrates in elevated cross-sectional view an exemplary electroadhesive system having an electroadhesion component and a secondary adhesion component adapted to adhere separate objects together according to one embodiment of the present invention.
Figure 7B:
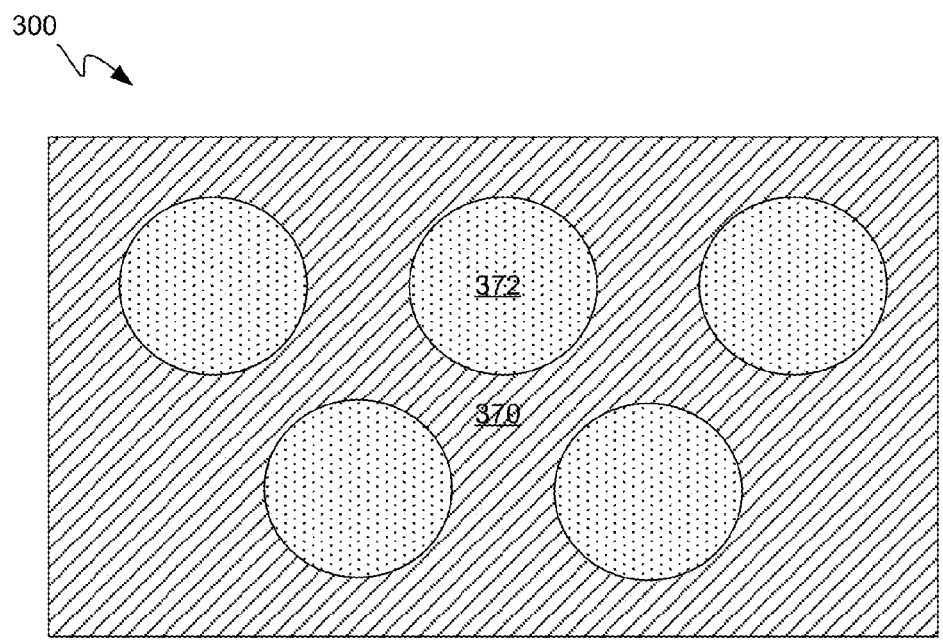
FIG. 7B illustrates in top cross sectional view the exemplary electroadhesive system of FIG. 7A according to one embodiment of the present invention.

FIG. 7A illustrates in elevated cross-sectional view an exemplary electroadhesive system having an electroadhesion component and a secondary adhesion component adapted to adhere separate objects together according to one embodiment of the present invention. In addition, FIG. 7B illustrates in top cross sectional view the exemplary electroadhesive system of FIG. 7A at the level of interface layer or film 370. Electroadhesive device or system 300 includes one or more electrodes 318 adapted to generate electroadhesive forces between the device or system 300 and a foreign object or substrate 314. An optional electrical insulation layer 350 can be formed from a relatively soft semiconductor or insulator material, which can be, for example, about 0.005 to 0.25 inches thick, with a Young's modulus of about 10-1000 Mpa. Similar to the foregoing embodiments, specific material examples for such an interface layer can include, for example, quick casting polyurethane resins from Tap Plastics, proprietary low durometer polymers such as Sorbothane®, or silicones with conductive fillers or nitrile rubbers.

In addition, an interface layer or film 370 having a pattern of openings therethrough can be situated between insulation layer 350 and the foreign object 314. Interface layer 370 can be relatively thin, with a thickness of about ½ to 10 mils, for example. In various embodiments, interface layer 370 can be adapted to pass electroadhesion forces (F1) therethrough from electrodes 318 to object 314, such that device 300 is adhered to object 314 across layer 370. In addition, interface layer 370 can be similar to traditional electrostatic interface layers, in that it not necessarily well suited to provide by itself any additional secondary forces (F2) for adhering device 300 to object 314.

Rather, layer 370 can include a number of openings therethrough where suitable soft pad components or materials 372 can contact layer 350 (or optionally electrode(s) 318) and the surface of the foreign object 314. Unlike the interface layer 370, these soft pad regions 372 can include materials or features, such as those detailed above, that are suitable for generating significant secondary forces (F2) to adhere device 300 to object 314. In some embodiments, layer 350 or device 300 generally can be designed such that soft pad materials 372 form a continuous layer (not shown) that extends only through the openings in interface film 370, while in other embodiments, soft pad materials can be located only at such openings. The number and pattern of openings through interface film or mask 370 can be designed strategically such that secondary forces (F2) can be manipulated and/or focused at certain points or regions, as may be readily appreciated.

In various embodiments, these multiple soft pad regions 372 can function as base surfaces that interact with the foreign object, are adapted to facilitate the application of the electrostatic force, and are also adapted to facilitate maintaining the current position of the electrostatic device relative to the foreign object in a secondary manner that is separate from the electrostatic force. Again, such a secondary manner or force can involve suction or a vacuum, van der Waals, and/or glue or other adhesive forces.

In addition to the foregoing embodiments and examples, many other features and details may also be applied that result in an effective adhesion force that can be all electroadhesion, all secondary forces, or a combination thereof, which can vary over time and location as may be desired. As another possible example, a one time permanent attachment feature can utilize a glue, wax, UV cure, phase changing material or other F2 type of permanent force that is enhanced during its application via the use of F1 type electroadhesive forces. Again, such F1 type forces can be used to minimize or eliminate the amount of mechanical pressing or smoothing forces that tend to be needed to apply a permanent adhesive in many instances.

Methods

Figure 8:
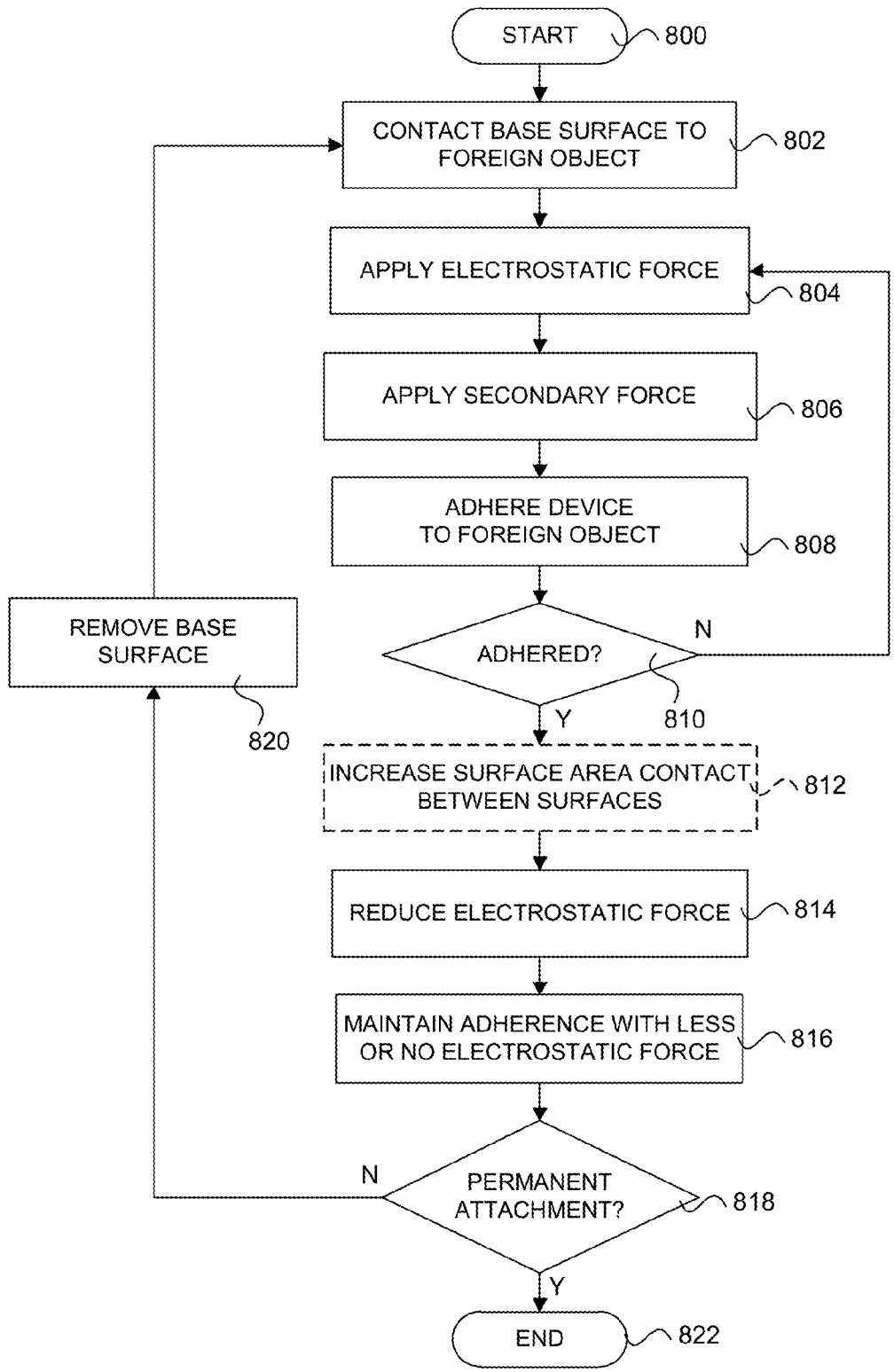
FIG. 8 provides a flowchart of an exemplary method of physically controlling a foreign object according to one embodiment of the present invention.

Although a wide variety of applications involving providing manipulating objects using electroadhesion can be imagined, one basic method is provided here as an example. Turning lastly to FIG. 8, a flowchart of an exemplary method of physically controlling a foreign object is provided. In particular, such a method can involve operating an electroadhesive or electrostatic device or system such as that which is described in greater detail above. It will be readily appreciated that not every method step set forth in this flowchart is always necessary, and that further steps not set forth herein may also be included. For example, neither increasing surface area contact between surfaces nor reducing electrostatic force is necessary in all embodiments. Further, the exact order of steps may be altered as desired for various applications. For example, steps 804 and 806 may be reversed or performed in parallel. Also, some steps may not be under control of the user, but may occur automatically in conjunction with and/or as a result of another step being performed. For example, step 806 might not be under control of the user, but happens as a result of step 804 being performed. This can occur, for example, where the surface has a sealing vacuum or van der Waals force in conjunction with an electroadhesive force. Other variations are also possible, as will be readily appreciated.

Beginning with a start step 800, a base surface is contacted to a surface of a foreign object at process step 802. An electrostatic force is then applied, such as by applying an electrostatic adhesion voltage, at process step 804, and a separate physical force or other secondary force is applied at process step 806. Again, the separate physical attraction or force can be provided by way of contacting the base surface at step 802, or as some combination of steps 802 and 804, or can be an entirely separate mechanism or process. The relevant electrostatic or electroadhesive device is thereby at least somewhat adhered to a foreign object or substrate at process step 808. At a subsequent decision step 810 an inquiry is made as to whether an adequate level of adherence is taking place. If not, then the method reverts to process step 804, where electrostatic force is applied or even increased.

Once an adequate level of adherence is observed at step 810, then the method continues to process step 812, where the surface area contact can optionally be increased between surfaces of the device and the foreign object. At the next process step 814, the electrostatic force can be reduced or even eliminated altogether, such as by reducing or shutting off the power to the electrodes. Adherence of the device to the foreign object or substrate is then maintained with less or no electrostatic force at process step 816. An inquiry can then be made at the following decision step 818 as to whether a permanent attachment between the device and foreign object is desired. If not, then the method can continue to process step 820, where the base surface is removed from contact from the foreign object or substrate. Although not shown, the method can also end at this point. Alternatively, the method can then be fully repeated starting at process step 802.

In the event that a permanent attachment is desired (or alternatively where object handling is finished) at process step 818, however, then the method proceeds to finish at and end step 822. Further steps not depicted can include, for example, moving or repositioning the base surface with respect to the foreign object, such as between times where adherence forces are applied. Other steps can include causing phase changes in materials for the secondary force, or reducing the separate physical or secondary force at pertinent times or locations, for example, and any or all of the steps may be repeated any number of times, as may be desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An electrostatic device, comprising:
   one or more electrodes adapted to produce collectively an electrostatic attraction force between the electrostatic device and a foreign object, wherein the electrostatic attraction force is suitable to facilitate maintaining a given position of the electrostatic device relative to the foreign object; and
   a base surface configured to interact with the foreign object, wherein the base surface facilitates the application of the electrostatic attraction force and also a separate physical attraction force between the electrostatic device and the foreign object, whereby the given position of the electrostatic device relative to the foreign object is maintained due to both the electrostatic attraction force and the separate physical attraction force, wherein said base surface comprises a deformable surface, and wherein at least a portion of the deformable surface moves closer to the foreign object when the electrostatic attraction force or the separate physical attraction force is applied.

2. The electrostatic device of claim 1, wherein the physical attraction force involves the use of a vacuum.

3. The electrostatic device of claim 2, wherein said base surface comprises a low durometer coating.

4. The electrostatic device of claim 1, wherein said base surface comprises an outer surface of said one or more electrodes.

5. The electrostatic device of claim 1, wherein said base surface comprises a plurality of cilia.

6. The electrostatic device of claim 1, wherein the separate physical attraction force is sufficient to maintain the current position of the electrostatic device relative to the foreign object for at least some period of time when the electrostatic attraction force is turned off.

7. The electrostatic device of claim 1, wherein the separate physical attraction force involves the use of a chemical adhesive.

8. The electrostatic device of claim 1, wherein the separate physical attraction force involves the use of a phase changing material.

9. The electrostatic device of claim 1, wherein the separate physical attraction force involves the use of a one-time permanent attaching feature.

10. The electrostatic device of claim 9, wherein the one-time permanent attaching feature is selected from the group consisting of: glue, wax, rubber and thermoplastic.

11. An electrostatic system, comprising:
    a device having a surface interface area that comprises a deformable surface, wherein contact of the surface interface area to a foreign object results in a physical attraction force; and
    at least one electrode located proximate to the device, wherein application of an electrostatic adhesion voltage across the at least one electrode produces an electrostatic attraction force between the device and the foreign object, whereby the physical attraction force and the electrostatic attraction force in combination adhere the device to the foreign object, and wherein at least a portion of the deformable surface moves closer to the foreign object when the electrostatic attraction force or the physical attraction force is applied.

12. The electrostatic system of claim 11, wherein the physical attraction force is selected from the group consisting of: vacuum, van der Waals, and adhesive forces.

13. The electrostatic system of claim 11, wherein the physical attraction force is only applied at a subset of locations that is less than all locations along the surface interface area.

14. The electrostatic system of claim 11, wherein the electrostatic attraction force, the physical attraction force, or both, are sufficient alone in the absence of the other force to adhere the device and the foreign object together for at least some significant period of time.

15. A method of controlling a foreign object, comprising:
    contacting a base surface to a foreign object, wherein said contacting provides a physical attraction force from at least a portion of the base surface to the foreign object;
    applying an electrostatic adhesion voltage across one or more electrodes located proximate to the base surface, wherein the electrostatic adhesion voltage creates an electrostatic attraction force through at least a portion of the base surface to the foreign object, whereby the combination of the physical attraction force and the electrostatic attraction force adheres the base surface to the foreign object; and
    after the base surface is adhered to the foreign object, increasing the surface area contact between the base surface and the foreign object surface by deforming a deformable surface portion of the base surface such that the deformable surface portion moves closer to the foreign object.

16. The method of claim 15, wherein the physical attraction force is selected from the group consisting of: vacuum, van der Waals, and adhesive forces.

17. The method of claim 15, further comprising:
after the base surface is adhered to the foreign object, reducing or eliminating the electrostatic attraction force; and
maintaining the adherence of the base surface to the foreign object using only the physical attraction force.

* * * * *